A. E. ROSEN.
DEVICE FOR MIXING SALAD DRESSING.
APPLICATION FILED MAR. 12, 1912.
1,064,172.
Patented June 10, 1913.
3 SHEETS—SHEET 1.
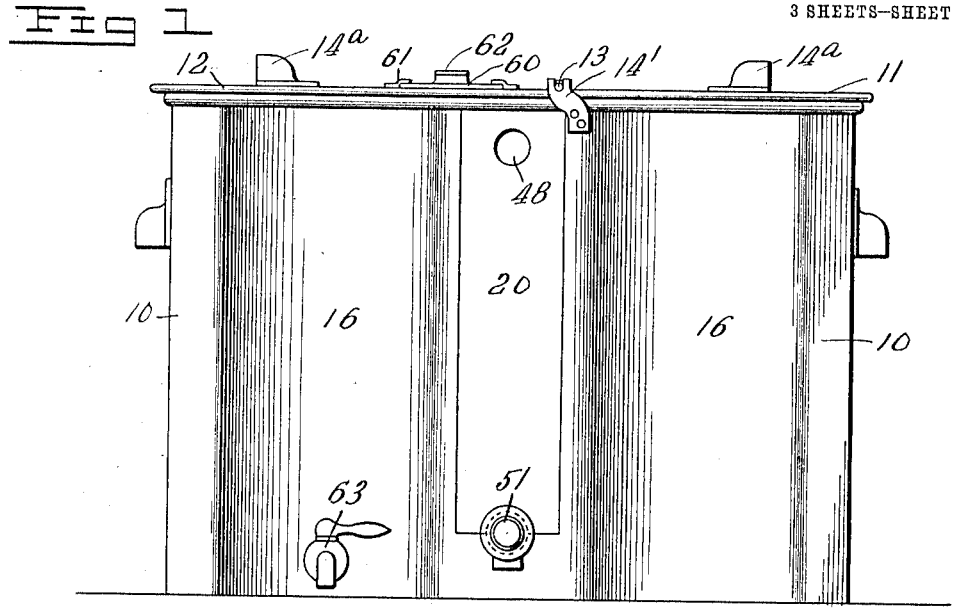
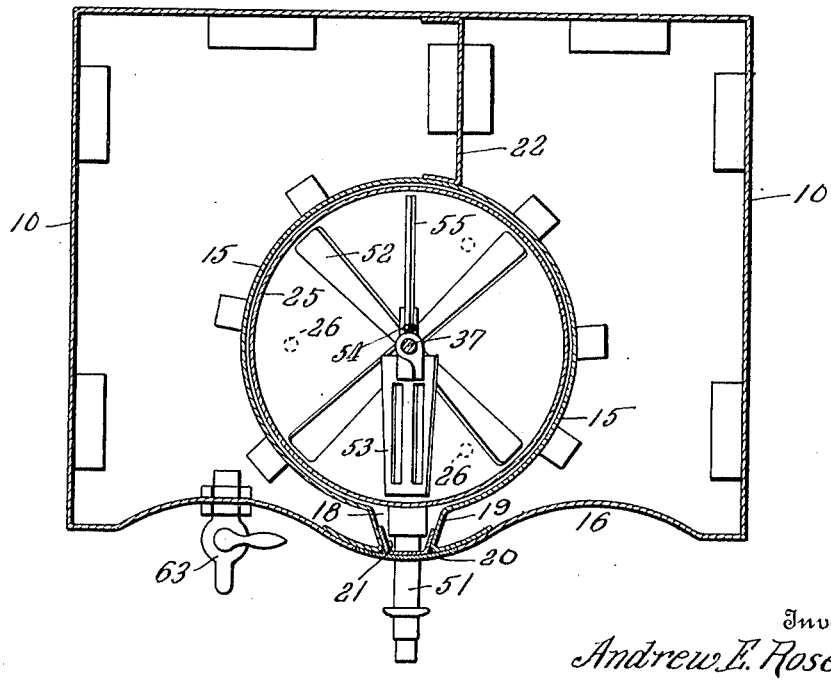
Witnesses
H. C. Robinette
J. J. Mawhinney
Inventor
Andrew E. Rosen
By
Luquer, Cushman & Pea
Attorneys

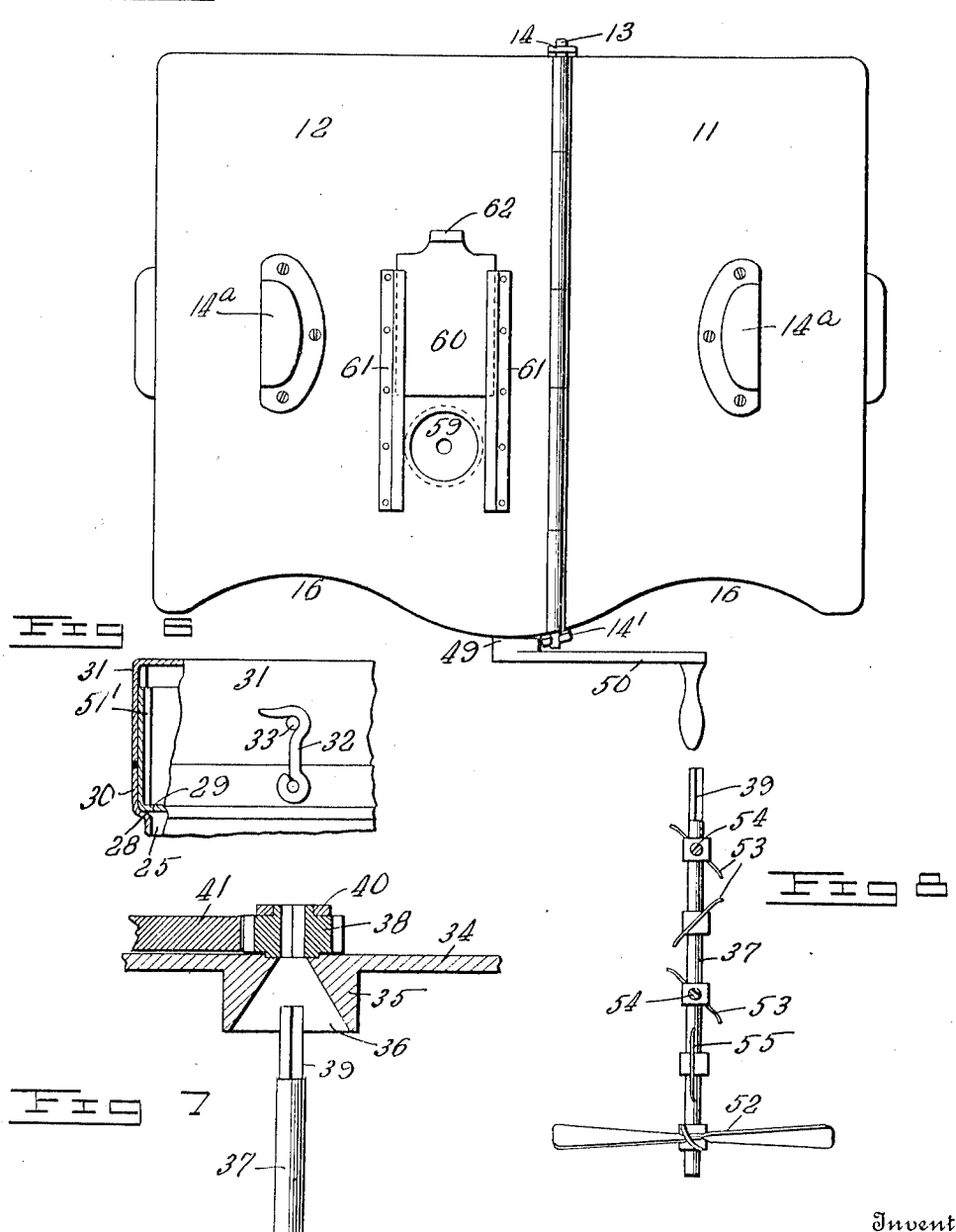

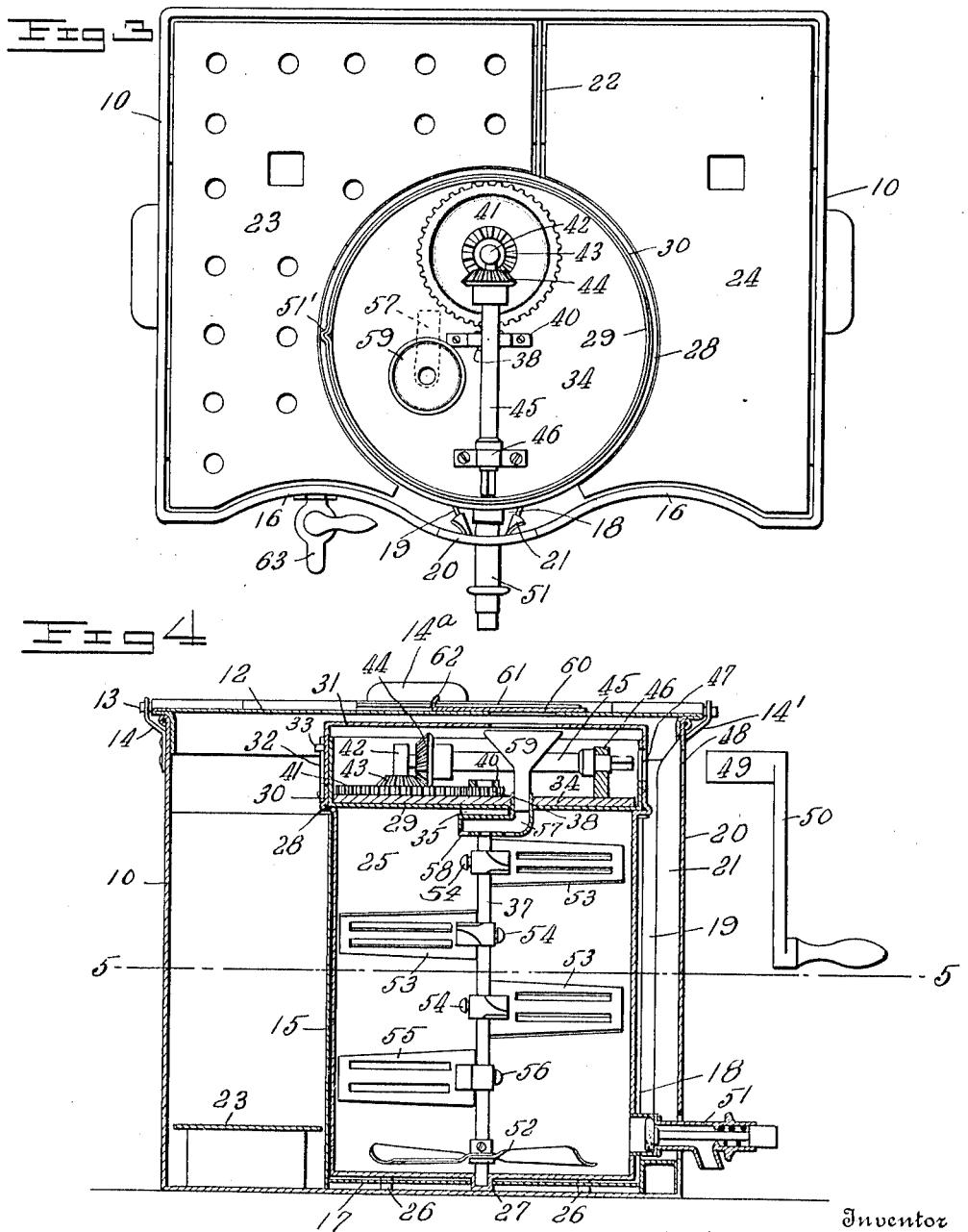

UNITED STATES PATENT OFFICE.

ANDREW E. ROSEN, OF WASHINGTON, DISTRICT OF COLUMBIA.

DEVICE FOR MIXING SALAD-DRESSING.

1,064,172.   Specification of Letters Patent.   Patented June 10, 1913.

Application filed March 12, 1912.   Serial No. 683,400.

*To all whom it may concern:*

Be it known that I, ANDREW E. ROSEN, a citizen of the United States, residing at Washington, in the District of Columbia, have invented new and useful Improvements in Devices for Mixing Salad-Dressing, of which the following is a specification.

This invention relates to mixing and storing devices, and has particular reference to an improved apparatus or device for mixing and storing salad dressings, and the like.

Considerable loss of time and annoyance has heretofore been experienced in handling salad, or other dressings since it is necessary to mix the ingredients in the desired quantities in a receptacle of sufficient size, and to then pour the mixed dressing from such receptacle into bottles or other vessels which must be placed in a refrigerator, or other cooling chamber to keep the dressing in proper condition until used. When these vessels stand for any appreciable length of time the component substances of the dressing become separated, the heavier substances collecting on the bottom of the vessel and gumming or adhering to the bottom and sides of the vessel, making it very difficult to thoroughly remix the ingredients when the dressing is to be used.

It is the prime object of this invention to provide an apparatus or device which, of itself, possesses all the necessary parts to mix, store, keep in a cool and proper condition, remix, and to deliver a salad dressing without the necessity of providing the separate devices now employed, for performing these several necessary functions, which are removed from one another and are not particularly adapted for this special use whereby there is a considerable loss of time and unnecessary labor in handling the dressing.

Another object of this invention is to provide the device with a mixing mechanism which will thoroughly agitate the contents to insure the desired and correct proportion of the ingredients throughout the entire mass of the dressing during the initial mixing of the dressing, and also after the ingredients have become separated when stored for any appreciable length of time. This mixing mechanism is designed to set up a current of the liquid flowing from the bottom of the device upward, and to set up a second current of the liquid flowing from the top downward to violently agitate the liquid by the meeting of these opposing currents, and to further create a centrifugal flow of the liquid at the meeting of these two currents to insure further and more violent agitation.

This invention has for a further object to provide means for feeding the ingredients into the device through a funnel to substantially the central portion of the receptacle of the device without displacing or hindering the operation of the centrally located mixing mechanism.

In the accomplishment of the above enumerated objects, the invention in one embodiment comprises, broadly, a casing or cabinet divided into a cooling compartment and a packing compartment, and provided with a storage chamber extending partly into both compartments in which is removably carried a receptacle or container into which the ingredients of the dressing are poured. This receptacle, or container, contains a mixing device operated by a mechanism housed in the cover of the receptacle for agitating and mixing the ingredients placed in the receptacle. Provision is made for drawing off desired quantities of the dressing from the receptacle without removing it from the cabinet, the same being accomplished by a drainage-cock of suitable construction which is carried in the lower end and at one side of the receptacle, and which projects through the side of the cabinet. The cabinet is provided with a slot or opening in its side through which the drainage-cock passes, and which admits of the removal and replacement of the receptacle without detaching the drainage-cock from the receptacle, means being provided for closing the slot to insure the tight sealing of the cabinet when the receptacle is in position. The cabinet is provided with a sectional and removable cover admitting the removal of the receptacle, and of independent access to the separate compartments. A funnel is housed in one side of the top of the receptacle, and has a distributing neck extending across and opening substantially at the central portion of the receptacle beneath the top to feed the material into the receptacle at such a portion.

Other objects and advantages of this invention will appear from the following specific description of this embodiment of the invention, and from the accompanying drawings, in which:

Figure 1 is a front elevation of the device; Fig. 2 is a top plan view of the same; Fig. 3 is a similar view with the cabinet cover and the upper top section of the receptacle removed; Fig. 4 is a transverse section taken centrally through the device; Fig. 5 is a horizontal section taken on the line 5—5 of Fig. 4, and with the false bottoms of the cooling and packing compartments removed; Fig. 6 is a detail enlarged fragmentary view, partly in section, of the sectional top in position on the receptacle; Fig. 7 is a detail enlarged sectional view, showing in disassembled relation the upper end of the dasher-shaft, and the connecting part of the operating mechanism with the guide for directing the shaft into the connecting part; and Fig. 8 is a detail view of the dasher or mixer.

Referring to the drawings, which disclose the present embodiment of this invention, the entire device is housed in a casing or cabinet 10, preferably rectangular in form and open at its upper side, and which is provided with a two-part cover 11 and 12 closing its upper side. The sections 11 and 12 of the cover are hinged together upon a common pintle 13 extending transversely across the front and rear walls of the cabinet, the pintle having its ends projecting beyond the walls and detachably engaging in the upper ends of a pair of registering bracket arms 14 and 14' extending upwardly and being offset outwardly from the front and rear walls of the casing 10. Preferably, the bracket arm 14 is provided with an opening receiving one end of the pintle 13, while the bracket 14' is provided with a slot opening through its upper end forming a socket into which the opposite end of the pintle 13 is adapted to rest. These bracket arms 14 and 14' engage the opposite edges of the cover of the cabinet and thereby hold the same in registration over the casing. Each section, 11 and 12, is provided with a finger grip 14ª positioned upon its upper side, and by means of which the sections may be independently raised to open the opposite ends of the casing.

Midway between the ends of the casing 10, but in close proximity to the front wall thereof is a storage chamber 15 formed by a cylindrical wall upstanding from the bottom of the casing. As will be noted particularly from Fig. 2 the front wall of the casing 10 is curved inwardly concentric to the storage chamber 15 at the opposite sides thereof to provide clearance spaces 16 for a purpose hereinafter set forth. The storage chamber 15 is provided with a false bottom 17 spaced slightly above the bottom of the casing 10 and being provided with circularly arranged openings therethrough. The front side of the storage chamber 15 is provided with a vertical slot or throat 18 extending from top to bottom thereof, the material removed to form the slot 18 being turned outwardly and conveying from the opposite sides of the slot to provide a pair of inclined flanges or guides 19. The front wall of the casing 10 is also slotted in registration with the slot 18, the slot in the front wall terminating at a point spaced a short distance above the bottom of the casing. A slide 20 is removably positioned in the slot of the casing for closing the same, and is provided with a pair of inwardly extending wings 21 bearing against the inner opposite sides of the guides 19 to support the slide 20 in position, the upper ends of the wings 21 being preferably flared to bind the wings against the guides and hold the slide 20 tightly in position.

The casing 10 is provided with a partition 22 extending from the rear wall of the casing to the rear side of the storage chamber 15, and being located toward one end of the casing 10 to divide the casing into relatively large and relatively small compartments. From this construction it will be observed that approximately two-thirds of the storage chamber extends into the larger compartment. A perforated false bottom 23 is arranged in the larger compartment and is spaced slightly above the bottom thereof for the reception of ice or other cooling agent, while an imperforate false bottom 24 is disposed in the smaller compartment for supporting measures and the like which are placed in the cabinet, and which are utilized in preparing the dressing.

Within the storage chamber 15 is snugly and removably fitted a receptacle 25 conforming to the cylindrical contour of the inner wall of the storage chamber and which is provided with a number of depending supporting legs 26 extending down through the openings in the false bottom 17 of the chamber 15 and resting upon the bottom of the casing 10. The central portion of the bottom of the receptacle 25 is depressed to provide a stepped bearing 27 projecting down through the false bottom 17 and resting upon the bottom of the casing 10. The upper end of the receptacle 25 is enlarged and beaded at a point slightly above the upper edge of the storage chamber 15 to strengthen the receptacle and to provide an inner annular shoulder 28 facing upwardly to support a dished upwardly opening top section 29 adapted to close the receptacle. The enlarged portion of the receptacle 25 extends a short distance up about the top section 29 to provide a ledge or flange 30 supporting the lower edge of an outer top section 31. The outer top section 30 is in the form of a cap which extends above and over the upper open side of the inner top section 29 to provide a hollow chamber within the top. Suitable fastening means, such as hooks 32, are carried upon the flange 30 and engage outstanding pins or studs 33 carried upon the outer top section 31.

A disk 34 is disposed within the inner section 29 and is provided with a central depending boss 35 having a downwardly flaring central opening, the wall of which forms a guide 36 receiving the upper extremity of the mixer shaft 37 and moving the shaft up into true vertical position in placing the top on the receptacle. Against the upper side of the disk 34, and immediately over the boss 35 is placed a pinion 38 having an angular axial opening communicating with the inner reduced end of the guide 36 and adapted to receive the angular shank 39 of the mixer shaft 37 to interlock the same with the pinion. The pinion is provided at its opposite sides with outstanding bosses, the lower one of which is seated in a depression in the disk 34 while the upper boss is received in a circular opening formed in a supporting strap 40 arched over the pinion 38 and having its ends secured upon the disk 34. A gear 41 is arranged against the upper face of the disk 34 in intermeshing relation with the pinion 38, the gear 41 being mounted upon an upstanding stud 42 carried by the disk 34. Centrally arranged upon the upper face of the gear 40 is a relatively small bevel gear 43 meshing with a vertically disposed bevel gear 44 carried upon a driving shaft 45. The driving shaft 45 is journaled at one end in the upper end of the stud 42 while its opposite end is mounted in a bearing 46 upstanding from the disk 34. The driving shaft is so arranged that it extends diametrically across the top of the disk 34 above the pinion 38, and its free end is located adjacent to the front side of the receptacle. The inner and outer top sections 29 and 31 are provided with registering openings 47 which register with the extremity of the operating shaft 45, and which register with an opening 48 formed in the slide 20. The extremity of the operating shaft 45 is formed angular in cross-section for the reception of a correspondingly formed head 49 of a crank handle 50 adapted to turn the shaft. The head 49 is slightly elongated to extend through openings 48 and 47 respectively and engage the angular shank of the operating shaft.

The receptacle 25 is provided adjacent to its bottom and in its front side with a drainage cock 51 of any suitable construction by means of which the contents of the receptacle may be withdrawn in desired quantities. This drainage cock 51 projects through the vertical slot 18 of the storage chamber 15 and through the slot in the front wall of the casing 10. The lower end of the slide 20 is recessed to snugly fit over the drainage cock 51 and form a tight joint about the same.

For the purpose of holding the inner and outer top sections 29 and 31 in correct position for registering the openings 47, and in correct position with respect to the receptacle 25, the flange 30, and the inner and outer top sections 29 and 31, are provided at one side with inwardly extending beads 51, formed preferably by crimping the sides of the respective members, which determine the correct positioning of the members and interfit to hold the same in such position.

The receptacle 25 is designed to carry a mixing device, the same being in the nature of a dasher having as its main portion the vertical shaft 37. The lower end of the dasher has a screw propeller 52 suitably secured upon the shaft and adapted for rotation therewith to create an upward current of the liquid placed in the receptacle. Arranged in longitudinally spaced relation upon the shaft 37 and preferably extending in different directions therefrom are a number of inclined paddles 53, adjustably secured to the shaft 37 by set screws 54, adapted to create a downward current of the contents of the receptacle. Arranged between the paddles 53 and the propeller 52, is a paddle 55, held in adjusted position on the shaft screw 56, which extends in the vertical plane of the shaft and is rotated to throw the contents of the receptacle centrifugally outward from the shaft 37 and diffuse the meeting currents of the liquid. Thus, when this improved dasher is operated, the propeller 52 forces the liquid upwardly, the paddles 53 force the liquid downwardly and the paddle 55 forces the liquid of the meeting streams or currents of the liquid toward the sides of the receptacle. It is thus noted that the contents of the receptacle 25 is thoroughly agitated whereby the ingredients of the dressing are thoroughly intermingled and a uniform mass is produced.

The inner top section 29 carries a distributer 57 preferably in the form of an elbow, one arm of which is threaded and extends upwardly through the section 29 and through the disk 34, while the horizontal arm thereof extends toward the central portion of the receptacle and is provided in its underside with a plurality of outlet openings 58 through which the ingredients are fed to the receptacle. A funnel 59 extends upwardly from the vertical arm of the elbow 57, its upper edge lying immediately beneath the outer top section 31. The top section 31 is provided with an opening immediately above the funnel 59 to admit the pouring of the ingredients of the salad dressing into the funnel.

The cover section 12 covers that portion of the receptacle top in which the funnel 59 is mounted, and for the purpose of admitting access to the funnel without raising the cover section 12, an opening is formed through the section 12 immediately over the funnel 59, the opening being normally closed by a slide 60 movable in ways 61 arranged in parallel relation upon the section 12 at the opposite sides of the opening. One end of the slide 60 is reduced and turned upwardly to provide a lip 62 by means of which the slide is operated to uncover and close the opening.

In the use of this improved device a quantity of ice is placed in the larger compartment, beneath the cover section 12, and about the major portion of the storage chamber 15. The smaller compartment of the cabinet is adapted to contain the measuring, and such other vessels and implements as are found necessary in collecting the various ingredients from which the salad dressing is made. When it is desired to mix a quantity of the dressing it is only necessary to push back the slide 60 and pour the various ingredients into the funnel 59, the liquids passing into the elbow 57 and through the openings 58 into the receptacle 25. The handle 50 is now applied to the operating shaft 45 by inserting the head 49 through the openings 48 and 47 respectively and over the angular portion of the shaft 45, when the handle is turned to actuate the bevel gears 44 and 43 respectively which turn the gear 41 and the pinion 38. As the shaft 37 is connected for rotation with the pinion 38, the dasher is rotated. As before explained, the rotation of the dasher produces opposing currents of the liquid flowing from the opposite ends of the receptacle and breaks up the meeting streams or currents of the liquid of the centrifugal action of the paddles 55. As disclosed in the drawings, the paddles employed in the formation of the dasher are provided with a number of openings extending throughout their lengths through which the liquid passes and which effects the thorough mixing of the ingredients.

As is well known, when the dressing is allowed to stand for any appreciable length of time its ingredients become separated, as the dressing is but a mechanical mixture, and the heavier ingredients fall to the bottom of the receptacle and adhere thereto. It is, therefore, an advantage to provide the storage receptacle with the mixing mechanism disposed and forming part of the same, since when the dressing is to be withdrawn it is only necessary to attach the operating handle 50 to the mechanism in the cover and set the dasher in motion. The dasher, by reason of its peculiar action, removes the adhering ingredients from the walls and the bottom of the receptacle and effects the thorough remixing of the dressing prior to withdrawing the same.

When it is desired to remove the receptacle 25 from the cabinet 10 for cleansing or other purposes, the pintle 13 is lifted out of the socket of the arm 14' raising the cover, and then the opposite end of the pintle is released from the arm 14 whereby the cover is freed from the cabinet. The hooks 32 are now released from the studs 33 and the cap-section 31 of the top removed from the receptacle. The inner section 29 is now lifted up from the shoulder 28, releasing the dasher-shaft 37 and admitting the withdrawal of the dasher from the receptacle. The slide 20 is now drawn upwardly to release the wings 21 from the flanges or guides 19 to free the slide. The receptacle 25 is now raised up out of the storage chamber 15, the drainage-cock 51 moving up in the vertical slot 18 and in the slot in the front wall of the cabinet. The reverse operations take place in replacing the parts, the lower end of the dasher-shaft 37 being fitted in the stepped bearing 27, and the guide 36 carried by the inner top section 29 positioning the shaft 37, if canted, in the opening of the pinion 38. A draining cock 63 is carried through one side of the casing and communicates with the lower end of the cooling compartment through which the collected water incident to the melting of the ice may be drawn off.

From this embodiment of the invention, it will be seen that the cabinet is so formed as to provide all of the necessary compartments and operating mechanism for mixing and storing such liquids as salad dressings, and that each part and mechanism are peculiarly adapted to perform the various functions necessary in mixing and making the dressing.

It will be understood that this disclosure is but one embodiment of this invention, and that various detail changes in the construction and arrangement of the parts may be had without departing from the spirit of this invention, the scope of the invention being defined by the subtended claims.

What I claim is:

1. A mixing device including a propeller adapted for positioning in the bottom of a receptacle whereby the liquid in the receptacle is raised from the bottom, paddles in the upper part of the receptacle adapted to force the liquid down toward the bottom, and a centrifugal paddle between said first paddles and the propeller and adapted to force the liquid against the wall of the receptacle.

2. In a liquid mixing device, a container, a lower cover section fitting over the container, a dasher mounted for rotation in the container and extending up through the lower cover section, a train of gears mounted upon the lower cover section and having connection with said dasher, an operating shaft journaled upon said lower cover, an upper cover engaging over said lower cover and housing said gears, and means externally of the cover adapted for connection therewith to rotate said dasher.

3. In a liquid mixing device, a vertical shaft, a propeller on the lower end of the shaft adapted to create an upward current, paddles on the upper end of the shaft adapted to create a downward current, an intermediate paddle on the shaft adapted to break the currents and throw the liquid centrifugally from the dasher, and operating means associated with said shaft for turning the same.

4. A mixing device comprising a propeller adapted for positioning in the bottom of a receptacle to raise the liquid therein, paddles in the upper part of the receptacle adapted to force the liquid down toward the bottom, a centrifugal paddle between said first paddles and the propeller and adapted to force the liquid toward the wall of the receptacle, a single shaft common to all of said paddles and said propeller, and means for turning said shaft.

5. A mixing device comprising a shaft, means for turning the shaft, and blades outstanding at various angles from the shaft, said blades being arranged in vertical spaced planes whereby to create fluid currents in opposite directions.

6. In a mixing device, a receptacle, a single shaft in the receptacle, means for rotating the shaft, and a plurality of blades mounted at various angles on the shaft whereby to effect up and down and centrifugal currents of the contents of the receptacle.

7. A mixing device comprising a shaft, means for turning the shaft and blades outstanding at various angles from the shaft, and adapted to create fluid currents in opposite directions.

In testimony whereof I have hereunto set my hand in presence of two subscribing witnesses.

ANDREW E. ROSEN.

Witnesses:
HARRY PETERS,
CHAS. R. SCHRAPS, Jr.

---

Copies of this patent may be obtained for five cents each, by addressing the "Commissioner of Patents, Washington, D. C."